United States Patent
Hama et al.

(10) Patent No.: US 10,340,527 B2
(45) Date of Patent: Jul. 2, 2019

(54) LITHIUM-ION SECONDARY BATTERY AND METHOD OF MANUFACTURING THE SAME

(71) Applicant: HITACHI CHEMICAL COMPANY, LTD., Tokyo (JP)

(72) Inventors: Yoshiki Hama, Tokyo (JP); Masaaki Sekiya, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 15/563,183

(22) PCT Filed: Mar. 30, 2016

(86) PCT No.: PCT/JP2016/060350
§ 371 (c)(1),
(2) Date: Sep. 29, 2017

(87) PCT Pub. No.: WO2016/159058
PCT Pub. Date: Oct. 6, 2016

(65) Prior Publication Data
US 2018/0083288 A1    Mar. 22, 2018

(30) Foreign Application Priority Data

Mar. 30, 2015   (JP) ................................. 2015-069836

(51) Int. Cl.
*H01M 4/134* (2010.01)
*H01M 4/74* (2006.01)
(Continued)

(52) U.S. Cl.
CPC ........... *H01M 4/742* (2013.01); *H01M 4/134* (2013.01); *H01M 4/136* (2013.01); *H01M 4/66* (2013.01);
(Continued)

(58) Field of Classification Search
CPC ......... H01M 10/0525; H01M 10/0585; H01M 4/134; H01M 4/66; H01M 4/136;
(Continued)

(56) References Cited

U.S. PATENT DOCUMENTS

2008/0299455 A1  12/2008  Shiozaki et al.
2010/0035150 A1   2/2010  Ando et al.
(Continued)

FOREIGN PATENT DOCUMENTS

EP   2 224 514 A1   9/2010
EP   2 492 994 A1   8/2012
(Continued)

OTHER PUBLICATIONS

JP 2008047458 MT (2008).*
(Continued)

*Primary Examiner* — Alexander Usyatinsky
(74) *Attorney, Agent, or Firm* — Fitch, Even, Tabin & Flannery, LLP

(57) ABSTRACT

A lithium-ion secondary battery that includes a positive electrode including a sulfur-based positive active material containing at least sulfur and a negative electrode including a silicon-based negative active material containing at least silicon or a tin-based negative active material containing tin, in which lithium ions are easily implanted and moved. A positive electrode includes a positive current collector and a sulfur-based positive active material containing at least sulfur (S). A negative electrode includes a negative current collector and a silicon-based negative active material containing at least silicon (Si) or a tin-based negative active material containing tin (Sn). The positive current collector is made of an aluminum foil having a plurality of through holes. The negative current collector is made of a copper foil having a plurality of through holes. The positive electrode and the negative electrode are stacked via a separator to form an electrode group.

5 Claims, 2 Drawing Sheets

(51) Int. Cl.
*H01M 4/136* (2010.01)
*H01M 4/66* (2006.01)
*H01M 4/70* (2006.01)
*H01M 10/052* (2010.01)
*H01M 10/0585* (2010.01)
*H01M 10/0525* (2010.01)

(52) U.S. Cl.
CPC ............. *H01M 4/661* (2013.01); *H01M 4/70* (2013.01); *H01M 10/052* (2013.01); *H01M 10/0525* (2013.01); *H01M 10/0585* (2013.01)

(58) Field of Classification Search
CPC ........ H01M 4/70; H01M 4/661; H01M 4/742; H01M 10/052
See application file for complete search history.

(56) References Cited

U.S. PATENT DOCUMENTS

2012/0288747 A1* 11/2012 Naoi ...................... H01G 11/12
429/178
2013/0029222 A1 1/2013 Niwa et al.
2014/0170476 A1 6/2014 Tan et al.
2014/0186704 A1 7/2014 Niwa et al.

FOREIGN PATENT DOCUMENTS

| | | | |
|---|---|---|---|
| EP | 2 720 303 A1 | | 4/2014 |
| JP | 2005-251469 A | | 9/2005 |
| JP | 2008-047458 A | | 2/2008 |
| JP | 2008047458 | * | 2/2008 |
| JP | 2008-300102 A | | 12/2008 |
| JP | 2010-040370 A | | 2/2010 |
| JP | 2013-058378 A | | 3/2013 |
| JP | 2013058378 | * | 3/2013 |
| JP | 2013-191328 A | | 9/2013 |
| JP | 2013-191331 A | | 9/2013 |
| JP | 2013191331 | * | 9/2013 |

OTHER PUBLICATIONS

International Search Report for PCT/JP2016/060350 dated Jul. 5, 2016; English translation submitted herewith (5 pages).
Search Report of EP Appln. No. 16772939.1 dated Aug. 24, 2018 in English.

* cited by examiner

LITHIUM-ION SECONDARY BATTERY AND METHOD OF MANUFACTURING THE SAME

CROSS-REFERENCE TO RELATED APPLICATIONS

This application is a U.S. national phase application filed under 35 U.S.C. § 371 of International Application No. PCT/JP2016/060350, filed Mar. 30, 2016, designating the United States, which claims priority from Japanese Application No. 2015-069836, filed Mar. 30, 2015, which are hereby incorporated herein by reference in their entirety for all purposes.

TECHNICAL FIELD

The present invention relates to a lithium-ion secondary battery that includes a positive electrode including a sulfur-based positive active material containing at least sulfur and a negative electrode including a silicon-based negative active material containing at least silicon or a tin-based negative active material containing tin, and to a method of manufacturing the lithium-ion secondary battery.

BACKGROUND ART

It is common that positive active materials for non-aqueous electrolyte secondary batteries such as lithium-ion secondary batteries and sodium-ion secondary batteries contain rare metals such as cobalt and nickel. However, such metals are available in small quantities and are expensive. In contrast, sulfur is currently available in a large quantity. Therefore, focus has been being placed on techniques in which sulfur (S) is used as a positive active material and silicon (Si) or tin (Sn) is used as a negative active material (see JP 2005-251469 A and JP 2013-191331 A, for example). It is said that, if sulfur is used as the positive active material of a lithium-ion secondary battery, the charge/discharge capacity of a lithium-ion secondary battery using sulfur alone as the positive active material is about six times or more the charge/discharge capacity of a lithium-ion secondary battery using a common lithium cobalt oxide positive electrode material, for example.

In the related art, a positive active material or a negative active material, a binder resin, and a conductive assistance are dispersed in a solvent to prepare slurry. The slurry is applied onto a plain metal foil that serves as a current collector, and the solvent in the slurry is dried and removed to form a mixture layer. The current collector and the mixture layer thereon are compacted using a roll pressing machine, and the binder resin is cured to fabricate a positive electrode and a negative electrode. Lithium is ionized and moved between the positive electrode and the negative electrode to serve as a substance (so-called charge carrier or carrier) involved in charge and discharge. In the related art, lithium is contained in an electrolyte and the positive active material.

RELATED-ART DOCUMENT

Patent Document

Patent Document 1: JP 2005-251469 A
Patent Document 2: JP 2013-191331 A

SUMMARY OF INVENTION

Technical Problem

In the lithium-ion secondary battery according to the related art which includes a positive electrode including a sulfur-based positive active material containing at least sulfur and a negative electrode including a silicon-based negative active material containing at least silicon or a tin-based negative active material containing tin, none of the positive active material, the negative active material, and the electrolyte contains sufficient lithium ions. It is necessary to preliminarily dope lithium into the positive active material or the negative active material by an electrochemical method, and it is difficult to obtain a structure in which the positive electrode and the negative electrode are stacked via a separator.

An object of the present invention is to provide a lithium-ion secondary battery, which includes a positive electrode including a sulfur-based positive active material containing at least sulfur and a negative electrode including a silicon-based negative active material containing at least silicon or a tin-based negative active material containing tin, and a method of manufacturing the same, which allows ready implantation and movement of lithium ions in a structure in which the positive electrode and the negative electrode are stacked via a separator.

Solution to Problem

A lithium-ion secondary battery of the present invention includes a positive electrode, a negative electrode, and a separator. The positive electrode includes a positive current collector and a sulfur-based positive active material containing at least sulfur (S). The negative electrode includes a negative current collector and a silicon-based negative active material containing at least silicon (Si) or a tin-based negative active material containing tin (Sn). The positive current collector is made of an aluminum foil having a plurality of through holes. The negative current collector is made of a copper foil having a plurality of through holes. The positive electrode and the negative electrode are stacked via the separator. If the aluminum foil having the plurality of through holes is used as the positive current collector and the copper foil having the plurality of through holes is used as the negative current collector, lithium ions are moved through the through holes formed in the current collectors even in a structure in which the positive electrode and the negative electrode are stacked via the separator. Therefore, the negative active material can be easily uniformly doped with the lithium ions. Either of a rolled copper foil and an electrolytic copper foil can be used as the copper foil. However, an electrolytic copper foil is preferably used.

Preferably, the aluminum foil is an aluminum perforated foil having a plurality of through holes formed to pierce the foil from a front surface to a back surface thereof. Preferably, the aluminum perforated foil has a foil thickness of 50 µm or less, the through holes formed in the aluminum perforated foil have an average inside diameter of 2 to 500 µm, and the aluminum perforated foil has a hole opening rate of 3 to 50%. Preferably, the copper foil having a plurality of through holes has a foil thickness of 50 µm or less, the through holes formed in the copper foil have an average inside diameter of 30 to 500 µm, and the copper foil has a hole opening rate of 3 to 50%. Use of such an aluminum perforated foil and a copper foil having a plurality of through holes allows the plurality of negative active materials to be doped with lithium ions, and is suitable for mass production of high-capacity lithium-ion secondary batteries.

If the average inside diameter of the through holes in the aluminum perforated foil is less than 2 μm, boring is difficult. If the average inside diameter is more than 500 μm, the positive active material mixture tends to fall off through the holes during application. If the hole opening rate of the through holes in the aluminum perforated foil is less than 3%, there is a possibility that the non-aqueous electrolyte does not sufficiently permeate into the positive active material. If the hole opening rate is more than 50%, the aluminum perforated foil tends to be wrinkled or torn during transport. The hole opening rate of the through holes in the aluminum perforated foil is more preferably 5 to 30% in order to reliably execute doping and prevent occurrence of a wrinkle or a tear.

If the average inside diameter of the through holes in the copper foil is less than 30 μm, boring is difficult. If the average inside diameter is more than 500 μm, the negative active material mixture tends to fall off through the holes during application. The average inside diameter of the through holes in the copper foil is more preferably 50 to 300 μm in order to facilitate forming of the through holes and prevent occurrence of fall-off through the holes. If the hole opening rate of the through holes in the copper foil is less than 3%, there is a possibility that the non-aqueous electrolyte does not sufficiently permeate into the negative active material. If the hole opening rate is more than 50%, the copper foil may be wrinkled or torn during transport.

The average inside diameter of the through holes in the aluminum perforated foil and the copper foil can be determined by various methods. Most conveniently, the average inside diameter can be obtained by magnifying the surface of the foil using a microscope, measuring the inside diameters of 100 through holes, and calculating the arithmetic mean of the measured values. The through holes are preferably shaped in a perfect circle or an ellipse or a polygon that is similar to a perfect circle for maintenance of the strength of the foil or ease of processing. If the through holes are in a shape other than a perfect circle, the average inside diameter of the through holes is calculated by additionally measuring the major axis and the minor axis.

There are various methods to determine the hole opening rates of the aluminum perforated foil and the copper foil. The hole opening rates can be determined by the best method according to the method of forming the through holes etc. For example, if the through holes in the aluminum perforated foil are formed by electrolytic etching and a surface portion with no through holes is also etched, the hole opening rate calculated by the expression "measured weight of perforated foil/theoretical weight of non-perforated foil" is more or less inaccurate because of a reduction in measured weight due to the etched portion. Thus, a method of transmitting light through the perforated foil, binarizing the transmitted light, and calculating the hole opening rate from the white/black proportion is preferable. If the copper foil is formed by pattern plating or pattern printing and etching, an accurate hole opening rate can be obtained using the expression "measured weight of perforated foil/theoretical weight of non-perforated foil" given above. It is to be noted, however, that calculation based on transmitted light can also be applied to obtain the hole opening rate.

In order to achieve uniform doping, preferably, the through holes formed in the aluminum perforated foil and the through holes formed in the copper foil each have a density of $1 \times 10^4$ holes/m² or more. The density of the through holes per unit area can be obtained by measuring the distance between the centers of two adjacent through holes at the same time as the measurement of the average inside diameter described above, and calculating the density based on the distance between the centers, for example. If the through holes are irregularly arranged, the number of through holes per a segment having a certain area is to be measured.

When the density (holes/m²) of the through holes per unit area has been obtained, defining the respective average inside diameters of the through holes formed in the aluminum perforated foil and the through holes formed in the copper foil as R (μm), the respective hole opening rates of the aluminum perforated foil and the copper foil may be indicated by the following expression.

$$\text{hole opening rate (\%)} = \frac{\pi R^2}{4} \times 10^{-12} \times \text{density(holes/}m^2\text{)} \times 100 \quad \text{[Expression 1]}$$

A method of manufacturing a lithium-ion secondary battery of the present invention includes: preparing an electrode group by stacking a positive electrode and a negative electrode via a separator, the positive electrode including a positive current collector and a sulfur-based positive active material containing at least sulfur (S), and the negative electrode including a negative current collector and a silicon-based negative active material containing at least silicon (Si) or a tin-based negative active material containing tin (Sn), wherein the positive current collector is made of an aluminum foil having a plurality of through holes, and the negative current collector is made of a copper foil having a plurality of through holes; disposing a lithium metal sheet adjacent to the electrode group; electrically connecting the lithium metal sheet to the negative current collector to ionize the lithium metal sheet into lithium ions; and doping the silicon-based negative active material or the tin-based negative active material with the lithium ions. With the manufacturing method according to the present invention, the negative active material can be easily doped uniformly with lithium ions even in a structure in which the positive electrode and the negative electrode are stacked via the separator.

DESCRIPTION OF EMBODIMENTS

Figure 1A:
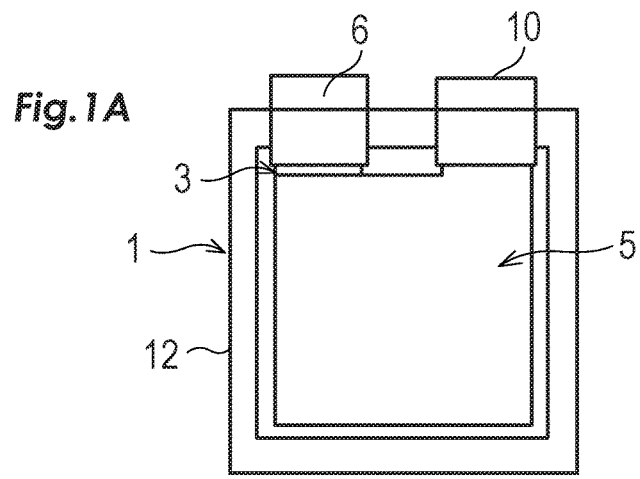
FIG. 1A illustrates a schematic configuration of an example lithium-ion secondary battery according to an embodiment of the present invention.
Figure 1B:
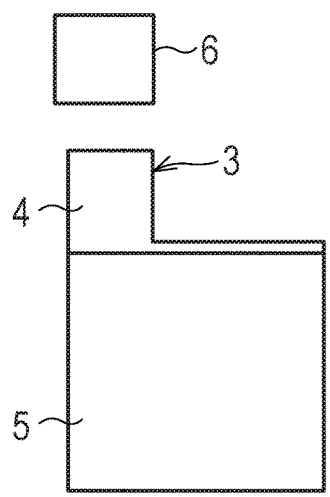
FIG. 1B illustrates a positive electrode.
Figure 1C:
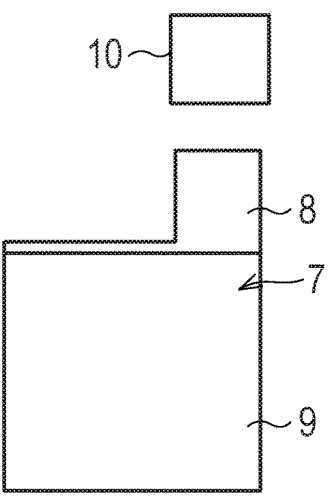
FIG. 1C illustrates a negative electrode.
Figure 1D:
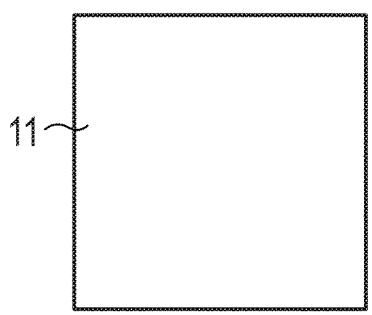
FIG. 1D illustrates a separator.
Figure 1E:
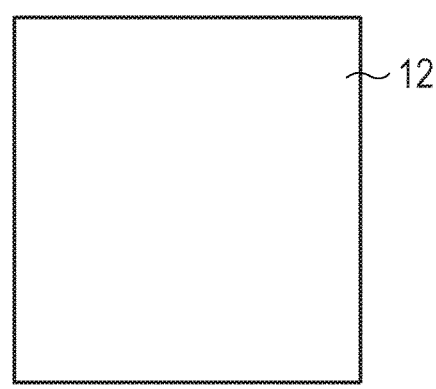
FIG. 1E illustrates a laminate film.
Figure 2:
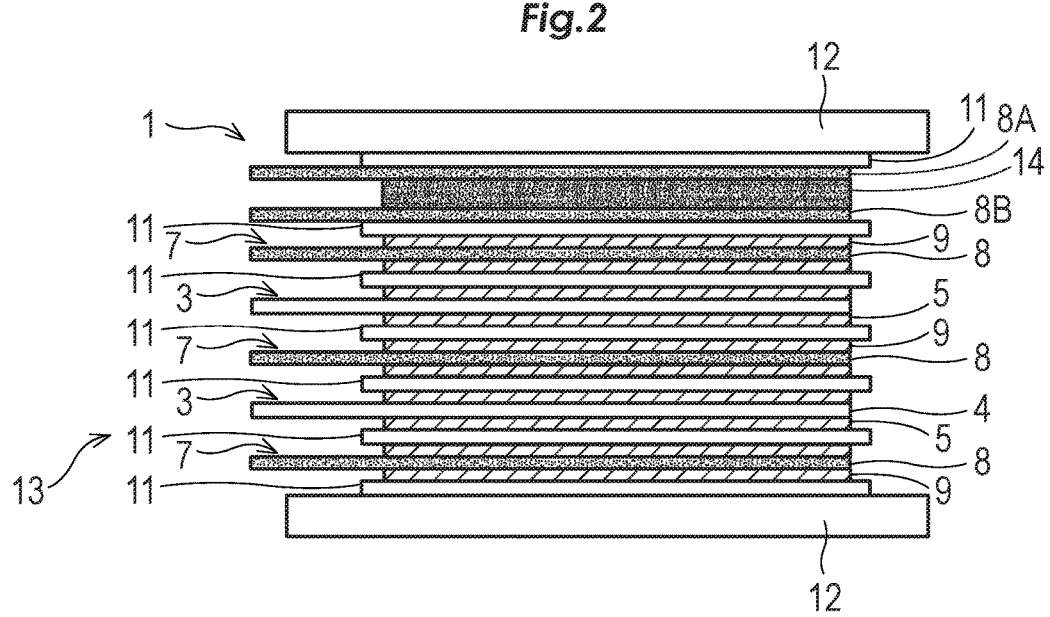
FIG. 2 schematically illustrates the internal configuration of the embodiment.

An example lithium-ion secondary battery according to an embodiment of the present invention will be described below with reference to the drawings. FIG. 1A illustrates a schematic configuration of an example lithium-ion secondary battery 1 according to an embodiment of the present invention. FIG. 1B illustrates a positive electrode 3. FIG. 1C illustrates a negative electrode 7. FIG. 1D illustrates a separator 11. FIG. 1E illustrates a laminate film 12. FIG. 2 schematically illustrates the internal configuration of the embodiment.

The positive electrode 3 includes a positive current collector 4 and a sulfur-based positive active material 5 containing at least sulfur (S). The negative electrode 7 includes a negative current collector 8 and a silicon-based negative active material 9 containing at least silicon (Si) or a tin-based negative active material 9 containing tin (Sn). Reference numerals 6 and 10 denote a positive electrode terminal lead and a negative electrode terminal lead, respectively.

The positive current collector 4 is made of an aluminum foil having a plurality of through holes. The aluminum foil is an aluminum perforated foil having a plurality of through holes formed to pierce the foil from a front surface to a back surface thereof. The aluminum perforated foil has a foil thickness of 50 μm or less. The density of the through holes is $1\times10^4$ holes/m$^2$ or more. The average inside diameter of the through holes is 2 to 500 μm.

The sulfur-based positive active material 5 is formed, for example, by mixing sulfur powder and carbon source compound powder with a binder to prepare a mixed paste raw material, applying the mixed paste raw material to the positive current collector, and thereafter heating (performing a heat treatment on) the positive current collector. Examples of the carbon source compound include pitch, polyisoprene, polycyclic aromatic hydrocarbons obtained by condensing three or more six-membered rings, and vegetable carbon materials such as coffee beans and seaweeds, etc.

The negative current collector 8 is made of a copper foil having a plurality of through holes. The copper foil has a foil thickness of 50 μm or less. The density of the through holes is $1\times10^4$ holes/m$^2$ or more. The average inside diameter of the through holes is 30 to 500 μm.

The negative active material layer contains a negative active material, a binder, and a conductive assistance, and is applied to both surfaces of the current collector. The negative active material contains silicon (Si) or tin (Sn).

The positive electrode 3 and the negative electrode 7 are stacked via the separator 11. The separator 11 is a rectangular sheet made of a polypropylene resin. The laminate film 12 has a structure in which a resin and an aluminum foil are stacked. In the embodiment, an electrode group 13 is sandwiched between a set of two laminate films 12, three sides of the laminate films 12 are sealed into a bag shape, and a predetermined non-aqueous electrolyte is poured into a space between the laminate films 12. After that, the remaining side of the laminate films 12 is sealed to form a laminate cell with the four sides tightly sealed and in which the electrode group 13 and the non-aqueous electrolyte are tightly enclosed.

In the embodiment, in order to dope the negative active material with lithium ions, a stack of two copper foils 8A and 8B each having a plurality of through holes and a lithium metal sheet 14 disposed therebetween, is disposed on one side of the electrode group 13. During doping, one or both of the copper foils 8A and 8B each having a plurality of through holes and the negative current collector 7 are electrically connected to each other. Through the electrical connection, lithium ions are eluted from the lithium metal sheet 14, and pass through the plurality of through holes formed in the positive current collector 4 and the negative current collector 8 so that the silicon-based negative active material 9 or tin-based negative active material 9 is doped with the lithium ions. When the lithium-ion secondary battery is completely charged, the lithium metal sheet 14 has been dissolved and does not exist any longer.

In the embodiment, the negative active material is doped with lithium ions through the through holes in the electrode foil. This significantly facilitates doping even in a structure in which the positive electrode and the negative electrode are stacked via the separator. Moreover, the negative active material can be uniformly doped with the lithium ions.

EXAMPLES

Example lithium-ion secondary batteries according to the present invention will be described below.

Example 1-1

A lithium-ion secondary battery was manufactured using a positive active material containing sulfur (S) and a negative active material containing silicon (Si).
(Positive Electrode)

An aluminum foil (thickness: 20 μm) for use in ordinary lithium-ion secondary batteries was subjected to a boring process by electrolytic etching to obtain a positive current collector having through holes formed thereon at a density of $1\times10^9$ holes/m$^2$ and with an average inside diameter of 10 μm. The hole opening rate was calculated by illuminating the foil with light from below, capturing an image of transmitted light and a non-transparent portion using a microscope, and binarizing the image. The hole opening rate was 22.5%.

A mixed paste raw material prepared by mixing 4.8 g of sulfur (Wako Pure Chemical Industries, Ltd.; product number 195-04625; purity 98%) as a positive active material, 2.4 g of acetylene black (Denki Kagaku Kogyo; product number HS-100) as a conductive assistance, and 6.7 g of PVDF (Kureha Corporation; product number L#1120) as a binder was applied to both surfaces of the positive current collector. The positive current collector was heated to prepare a positive electrode. The positive active material mixture after being heated had 4.0 mg/cm$^2$, and was shaped into 7 cm×7.5 cm by shaving unnecessary portions.
(Negative Electrode)

A copper foil (thickness: 15 μm) for use in ordinary lithium-ion secondary batteries was subjected to pattern printing and thereafter etching to form through holes to obtain a negative current collector with through holes having a density of $1\times10^{11}$ holes/m$^2$ and an average inside diameter of 1 μm. The measured weight of a square piece of 10 cm×10 cm was 1.080 g, which was 7.9% (hole opening rate) of the theoretical weight (1.347 g).

A mixed paste raw material prepared by mixing 6.4 g of silicon monoxide (SiO) (Wako Pure Chemical Industries, Ltd.; product number 198-05612; purity 99.9%) as a negative active material, 0.4 g of acetylene black (Denki Kagaku Kogyo; product number HS-100) as a conductive assistance, and 10 g of PVDF (Kureha Corporation; product number L#1120) as a binder was applied to both surfaces of the negative current collector. The negative current collector was heated to prepare a negative electrode. The negative active material mixture after being heated had 4.0 mg/cm$^2$, and was shaped into 7 cm×7.5 cm by shaving unnecessary portions.
(Assembly of Battery)

The separator was a rectangular sheet made of a polypropylene resin. The laminate film was formed mainly from nylon, aluminum, and a polypropylene resin. The separator and the laminate film were for use in ordinary lithium-ion secondary batteries. As illustrated in FIG. 2, the positive electrode and the negative electrode were stacked via the separator in two layers for the positive electrode and in three layers for the negative electrode to form an electrode group. The laminate film of 20 cm×11 cm was folded into half along the long side. Two sides of the laminate film were sealed into a bag shape. After that, the electrode group was inserted and a non-aqueous electrolyte was poured into the laminate film. The non-aqueous electrolyte included ethylene carbonate, dimethyl carbonate, and methylethyl carbonate, and was for use in ordinary lithium-ion secondary batteries. After that, the four sides of the laminate film were tightly sealed.

In the cell, as illustrated in FIG. 2, a stack of two copper foils each having a plurality of through holes and a lithium metal sheet disposed therebetween, was disposed on one side of the electrode group. The copper foils and the negative current collector were electrically connected to each other by ultrasonic welding. The cell was left to stand for two weeks at 50° C., which allowed lithium ions to be eluted from the lithium metal sheet and to be doped into the negative active material containing silicon.

When the lithium metal sheet was dissolved, charge was completed, thereby obtaining a lithium-ion secondary battery according to Example 1-1.

Examples 1-2 to 1-7

Lithium-ion secondary batteries according to Examples 1-2 to 1-7 were obtained under the same conditions as Example 1-1 except that the average inside diameter and the number of the through holes in the negative current collector were 2 μm and $1 \times 10^{11}$ holes/m$^2$, 10 μm and $1 \times 10^9$ holes/m$^2$, 50 μm and $1 \times 10^8$ holes/m$^2$, 300 μm and $1 \times 10^6$ holes/m$^2$, 500 μm and $5 \times 10^8$ holes/m$^2$ and 700 μm and $2.5 \times 10^6$ holes/m$^2$, respectively.

Comparative Example 1-1

A lithium-ion secondary battery according to Comparative Example 1-1 was obtained under the same conditions as Example 1-1 except that the negative current collector had no through holes.

While doping did not progress when an aluminum foil with no through holes was used, doping progressed when an aluminum foil having through holes was used. The lithium-ion batteries, which used the aluminum foil having through holes with an average inside diameter of 2 μm to 500 μm, exhibited good performance. However, the non-aqueous electrolyte did not sufficiently permeate the through holes in the lithium-ion battery that used the aluminum foil having through holes with an average inside diameter of 1 μm, and the material fell off through the holes when applied to the positive current collector for the lithium-ion battery that used the aluminum foil having through holes with an average inside diameter of 700 μm. This result indicates lowered performance compared to lithium-ion batteries that used the aluminum foil having through holes with an average inside diameter of 2 μm to 500 μm.

Example 2-1

A lithium-ion secondary battery was manufactured using a positive active material containing sulfur (S) and a negative active material containing silicon (Si). A lithium-ion secondary battery according to Example 2-1 was prepared under the same conditions as Example 1-1 except that an aluminum foil having through holes with an average inside diameter of 50 μm and with the number of the through holes being $1 \times 10^8$ holes/m$^2$ was used as the positive current collector and a copper foil having through holes with an average inside diameter of 10 μm and with the number of the through holes being $1 \times 10^9$ holes/m$^2$ was used as the negative current collector.

Examples 2-2 to 2-6

Lithium-ion secondary batteries according to Examples 2-2 to 2-6 were obtained under the same conditions as Example 2-1 except that the average inside diameter and the number of the through holes in the positive current collector were 30 μm and $5 \times 10^8$ holes/m$^2$, 50 μm and $1 \times 10^8$ holes/m$^2$, 300 μm and $1 \times 10^6$ holes/m$^2$, 500 μm and $5 \times 10^5$ holes/m$^2$,

TABLE 1

| | Average inside diameter (μm) of through holes | Number (holes/m$^2$) of holes | Hole opening rate (%) | Performance Capacity | Evaluation |
|---|---|---|---|---|---|
| Comp. Ex. 1-1 | No through holes | 0 | 0 | 39 mAh | x: Doping did not progress |
| Ex. 1-1 | 1 | $1 \times 10^{11}$ | 7.9 | 71 mAh | Δ: Electrolyte did not sufficiently permeate |
| Ex. 1-2 | 2 | $1 \times 10^{11}$ | 31.4 | 195 mAh | ○ |
| Ex. 1-3 | 10 | $1 \times 10^9$ | 7.9 | 202 mAh | ○ |
| Ex. 1-4 | 50 | $1 \times 10^8$ | 19.6 | 212 mAh | ○ |
| Ex. 1-5 | 300 | $1 \times 10^6$ | 7.1 | 206 mAh | ○ |
| Ex. 1-6 | 500 | $5 \times 10^8$ | 9.8 | 197 mAh | ○ |
| Ex. 1-7 | 700 | $2.5 \times 10^6$ | 9.6 | 140 mAh | Δ: Material fell off through holes in foil during application |

The discharge capacity was measured in an environment at 25° C. First, the battery was subjected to a constant current charge with a current value of 0.5 CA to an upper limit voltage of 2.2 V. When the upper limit voltage was reached, the battery was subjected to a constant voltage charge at 2.2 V for one hour. The battery was subjected to a constant current discharge with a current value of 0.5 CA to a lower limit voltage of 1V to calculate the capacity.

and 700 μm and $2.5 \times 10^5$ holes/m$^2$, respectively. Example 2-1 was the same as Example 1-3.

Comparative Example 2-1

A lithium-ion secondary battery according to Comparative Example 2-1 was obtained under the same conditions as Example 2-1 except that the positive current collector had no through holes.

TABLE 2

|  | Average inside diameter (μm) of through holes | Number (holes/m$^2$) of holes | Hole opening rate (%) | Performance | |
|---|---|---|---|---|---|
|  |  |  |  | Capacity | Evaluation |
| Comp. Ex. 2-1 | No through holes | 0 | 0 | 2 mAh | x: Doping did not progress |
| Ex. 2-1 | 10 | $1 \times 10^9$ | 7.9 | 155 mAh | Δ: Doping was not uniform |
| Ex. 2-2 | 30 | $5 \times 10^8$ | 35.3 | 215 mAh | ○ |
| Ex. 2-3 | 50 | $1 \times 10^8$ | 19.6 | 210 mAh | ○ |
| Ex. 2-4 | 300 | $1 \times 10^6$ | 7.1 | 199 mAh | ○ |
| Ex. 2-5 | 500 | $5 \times 10^5$ | 9.8 | 204 mAh | ○ |
| Ex. 2-6 | 700 | $2.5 \times 10^5$ | 9.6 | 177 mAh | Δ: Material fell off through holes in foil during application |

While doping did not progress when a copper foil with no through holes was used, doping progressed when a copper foil having through holes was used. The lithium-ion batteries, which used the aluminum foil having through holes with an average inside diameter of 30 μm to 500 μm, exhibited good performance. However, doping was not uniform in the lithium-ion battery that used the aluminum foil having through holes with an average inside diameter of 10 μm, and the material fell off through the holes when applied to the positive current collector for the lithium-ion battery that used the aluminum foil having through holes with an average inside diameter of 700 μm. This result indicates lowered performance compared to lithium-ion batteries that used the aluminum foil having through holes with an average inside diameter of 30 μm to 500 μm.

Examples 3 and 4

A lithium-ion secondary battery was manufactured using a positive active material containing sulfur (S) and a negative active material containing tin (Sn).

A mixed paste raw material prepared by mixing 6.8 g of tin oxide ($SnO_2$) (Wako Pure Chemical Industries, Ltd.; product number 329-94293; purity 99.7%) as a negative active material, 0.5 g of acetylene black (Denki Kagaku Kogyo; product number HS-100) as a conductive assistance, and 5.8 g of PVDF (Kureha Corporation; product number L#1120) as a binder was applied to both surfaces of the negative current collector. The negative current collector was heated to prepare a negative electrode. The negative active material mixture after being heated had 4.0 mg/cm$^2$, and was shaped into 7 cm×7.5 cm by shaving unnecessary portions. The mixed paste raw material was applied to the negative current collector to prepare a negative electrode.

Lithium-ion secondary batteries according to Examples 3-1 to 3-7, Comparative Example 3-1, Examples 4-1 to 4-6, and Comparative Example 4-1 were prepared through the same processes as Example 1-1 etc. described above except for preparation of the negative electrode. The discharge capacities of the lithium-ion secondary batteries were measured and evaluated. The results are indicated in Tables 3 and 4.

TABLE 3

|  | Average inside diameter (μm) of through holes | Number (holes/m$^2$) of holes | Hole opening rate (%) | Performance | |
|---|---|---|---|---|---|
|  |  |  |  | Capacity | Evaluation |
| Comp. Ex. 3-1 | No through holes | 0 | 0 | 30 mAh | x: Doping did not progress |
| Ex. 3-1 | 1 | $1 \times 10^{11}$ | 7.9 | 78 mAh | Δ: Electrolyte did not sufficiently permeate |
| Ex. 3-2 | 2 | $1 \times 10^{11}$ | 31.4 | 208 mAh | ○ |
| Ex. 3-3 | 10 | $1 \times 10^9$ | 7.9 | 198 mAh | ○ |
| Ex. 3-4 | 50 | $1 \times 10^8$ | 19.6 | 195 mAh | ○ |
| Ex. 3-5 | 300 | $1 \times 10^6$ | 7.1 | 212 mAh | ○ |
| Ex. 3-6 | 500 | $5 \times 10^8$ | 9.8 | 203 mAh | ○ |
| Ex. 3-7 | 700 | $2.5 \times 10^6$ | 9.6 | 165 mAh | Δ: Material fell off through holes in foil during application |

TABLE 4

|  | Average inside diameter (μm) of through holes | Number (holes/m$^2$) of holes | Hole opening rate (%) | Performance | |
|---|---|---|---|---|---|
|  |  |  |  | Capacity | Evaluation |
| Comp. Ex. 4-1 | No through holes | 0 | 0 | 3 mAh | x: Doping did not progress |
| Ex. 4-1 | 10 | $1 \times 10^9$ | 7.9 | 172 mAh | Δ: Doping was not uniform |
| Ex. 4-2 | 30 | $5 \times 10^8$ | 35.3 | 208 mAh | ○ |
| Ex. 4-3 | 50 | $1 \times 10^8$ | 19.6 | 192 mAh | ○ |
| Ex. 4-4 | 300 | $1 \times 10^6$ | 7.1 | 197 mAh | ○ |

TABLE 4-continued

| | Average inside diameter (μm) of through holes | Number (holes/m²) of holes | Hole opening rate (%) | Performance Capacity | Evaluation |
|---|---|---|---|---|---|
| Ex. 4-5 | 500 | 5 × 10⁵ | 9.8 | 203 mAh | ○ |
| Ex. 4-6 | 700 | 2.5 × 10⁵ | 9.6 | 156 mAh | Δ: Material fell off through holes in foil during application |

In this way, it was found that lithium-ion secondary batteries having performance equivalent to that of the lithium-ion secondary batteries in which a silicon-based negative active material was used according to Example 1-1 etc. were obtained even if a tin-based negative active material containing tin (Sn) was used.

INDUSTRIAL APPLICABILITY

According to the present invention, an aluminum foil having a plurality of through holes is used as a positive current collector and a copper foil having a plurality of through holes is used as a negative current collector in a lithium-ion battery in which a positive electrode includes the positive current collector and a sulfur-based positive active material containing at least sulfur (S) and a negative electrode includes a negative current collector and a silicon-based negative active material containing at least silicon (Si) or a tin-based negative active material containing tin (Sn). Lithium ions are moved through the through holes formed in the current collectors. Therefore, the negative active material can be easily doped uniformly with the lithium ions, thereby facilitating manufacture of a lithium-ion battery in which a positive electrode and a negative electrode are stacked via a separator.

DESCRIPTION OF REFERENCE NUMERALS 1 lithium-ion secondary battery
3 positive electrode
4 positive current collector
5 sulfur-based positive active material
6 positive electrode terminal lead
7 negative electrode
8 negative current collector
8A, 8B copper foil having a plurality of through holes
9 silicon-based negative active material or tin-based negative active material
10 negative electrode terminal lead
11 separator
12 laminate film
13 electrode group
14 lithium metal sheet

The invention claimed is:

1. A lithium-ion secondary battery comprising:
a positive electrode including a positive current collector and a sulfur-based positive active material containing at least sulfur (S);
a negative electrode including a negative current collector and a silicon-based negative active material containing at least silicon (Si) or a tin-based negative active material containing tin (Sn); and
a separator, wherein:
the positive current collector is made of an aluminum perforated foil having a plurality of through holes formed to pierce the foil from a front surface to a back surface thereof;
the negative current collector is made of a copper foil having a plurality of through holes; and
the positive electrode and the negative electrode are stacked via the separator;
the through holes formed in the aluminum perforated foil and the through holes formed in the copper foil each have a density of 1×10⁴ holes/m² or more and a hole opening rate of 3 to 50%; and
when the respective average inside diameters of the through holes formed in the aluminum perforated foil and the through holes formed in the copper foil are defined as R (μm), the respective hole opening rates of the aluminum perforated foil and the copper foil are indicated by the following expression:

$$\text{hole opening rate (\%)} = \frac{\pi R^2}{4} \times 10^{-12} \times \text{density(holes}/m^2) \times 100.$$ [Expression 1]

2. The lithium-ion secondary battery according to claim 1, wherein:
the aluminum perforated foil has a foil thickness of 50 μm or less;
the through holes formed in the aluminum perforated foil have an average inside diameter of 2 μm to 500 μm;
the copper foil has a foil thickness of 50 μm or less; and
the through holes formed in the copper foil have an average inside diameter of 30 μm to 500 μm.

3. The lithium-ion secondary battery according to claim 2, wherein
the aluminum perforated foil has a hole opening rate of 5 to 30%.

4. The lithium-ion secondary battery according to claim 2, wherein
the through holes formed in the copper foil have an average inside diameter of 50 μm to 300 μm.

5. The lithium-ion secondary battery according to claim 3, wherein
the through holes formed in the copper foil have an average inside diameter of 50 μm to 300 μm.

* * * * *